(12) United States Patent
Champlin

(10) Patent No.: US 6,234,490 B1
(45) Date of Patent: May 22, 2001

(54) LEAKFREE PUMPBACK PACKING

(76) Inventor: George B. Champlin, 218 Green St., Stoneham, MA (US) 02180

(*) Notice: Subject to any disclaimer, the term of this patent is extended or adjusted under 35 U.S.C. 154(b) by 0 days.

(21) Appl. No.: 09/350,959

(22) Filed: Jul. 9, 1999

(51) Int. Cl.[7] .............................. F16J 15/26; F16J 15/02
(52) U.S. Cl. .......................................... 277/512; 277/537
(58) Field of Search .................................. 277/511, 512, 277/513, 537, 534, 539, 529, 530, 540

(56) References Cited

U.S. PATENT DOCUMENTS

| | | | |
|---|---|---|---|
| 3,791,658 | * 2/1974 | Zumeta et al. | 277/230 |
| 4,157,835 | * 6/1979 | Kahle et al. | 277/204 |
| 4,486,026 | * 12/1984 | Furumura et al. | |
| 4,559,862 | * 12/1985 | Case et al. | 277/230 |
| 4,949,620 | * 8/1990 | Swan et al. | 277/228 |
| 5,056,800 | * 10/1991 | Becker | |
| 5,419,568 | * 5/1995 | Champlin | 277/230 |
| 5,573,253 | * 11/1996 | Naitou et al. | 277/204 |
| 5,622,371 | * 4/1997 | Angelo et al. | 277/105 |
| 5,758,881 | * 6/1998 | Stanley | |
| 5,827,042 | * 10/1998 | Ramsay | |
| 5,934,683 | * 8/1999 | Sieghartner | |
| 6,045,136 | * 4/2000 | White | |

* cited by examiner

Primary Examiner—Anthony Knight
Assistant Examiner—Vishal Patel
(74) Attorney, Agent, or Firm—Robert K. Tendler

(57) ABSTRACT

A mechanical packing braided such that a number of angled recesses or projections at predetermined intervals are formed in the surface of the braid adjacent a rotating shaft, the recesses or projections causing a deflecting hydrodynamic force on the fluid film between the packing and shaft such that leakage of the fluid from under the packing set is reduced when compared to normally braided packing under the same conditions. When constructed from yarns suitable for very low seal water requirements, the rejective "pumpback" force on the fluid film is sufficient to reduce the leakage of seal water to zero so that exfoliated graphite packing which normally has a 95% reliability when running dry can be given a 99.5% reliability. In one troublesome scenario, th subject packing operates to stop leakage due to pressure surges so that water which would ordinarily leak out even with the use of yarns having exfoliated graphite fibers is contained.

7 Claims, 3 Drawing Sheets

LEAKFREE PUMPBACK PACKING

FIELD OF THE INVENTION

This invention relates to mechanical braided packing, and more particularly to a system for preventing leakage from a stuffing box.

BACKGROUND OF THE INVENTION

While reliable sealing methods utilizing mechanical braided packing and the like have been devised in the past, invariably with mechanical braided packing, there is leakage from within the stuffing box between the packing and shaft to the exterior atmosphere through the annulus formed between the packing gland and pump shaft, despite the best effort of mechanics to minimize such leakage. This leakage has become a severe environmental problem.

Presently, environmental legislation mandates both water conservation and provides standards relating to the amount of material which can be allowed to escape into the environment from a plant, and in particular, from the stuffing boxes used to seal pumps. These requirements vary from location to location and are dependent upon the kind of quality of fluid effluent. The reason for the variation in the standard is that in general, there are so-called cluster rules, which define the allowable water usage and effluent permitted to escape from multiple installations. While it may be that certain power plants in the area may comply with the environmental rules and regulations, other plants in the same area may not comply. It was for this reason that cluster rules were adopted so that a company could comply with the regulations by satisfying an overall requirement for all of the sites within given area.

One way to comply with environmental requirements is to provide packing in which no leakage occurs. This however, has proved elusive, with attempts at eliminating leakage by tightening down of the gland, resulting in undue shaft wear and pump failure. Moreover, even with the use of newer packings, leakage still exists due to pump surges. When this happens, the fluid which is being pumped leaks out from the annulus between the pump shaft and the stuffing box packing gland. Sometimes as little as a 1 psi surge can cause an uncontrollable leak of product from the stuffing box, regardless of what packing is being used. This is known as a "blow out" within the industry.

Recent developments in packing materials involve the use of exfoliated graphite, which results in very little leakage for a reliability of 95%. However, pump surges still result in leakage, and pose a possible non-compliance problem.

It will be appreciated that exfoliated graphite packings have been used in the past in an effort to comply with environmental standards by running dry to eliminate seal water consumption. Thus, it has become desirable to eliminate seal water wherever possible. In place of the clean seal water, the fluid under the packing becomes the fluid pumped. In these cases, oftentimes, the pumps operate "dry". Increasing gland pressure on the packing is used to prevent any leakage of product from the stuffing box. However, this results in shortened packing and sleeve life, increases power consumption, and requires added maintenance costs.

More particularly, recent development of packings made from certain yarns has lead to methods of increased reliability of "dry" running with zero product leakage. These methods are not perfect however, and have a success rate that varies between 50–95% depending on the kind of packing yarn used, and upon the braided construction of the packing. Exfoliated graphite yarns have been produced which are very malleable, provide increased heat transfer and are suitable for use in a range of applications. As will be seen hereinafter, when used in combination with graphite filaments, these yarns provide a vehicle to permit hydrodynamic sealing.

In applications where exfoliated graphite packings will not provide adequate seals, clean seal water is still used for lubrication and to prevent the dirtier pumped fluids from leaking out of the stuffing box. However, this clean sealing water also leaks from the stuffing box.

There is therefore a necessity for providing a reliable system in which leakage to the outside world from the stuffing boxes can be virtually eliminated.

In the past, there have been so called hydrodynamic oil seals which through the rotation of the rotary apparatus forces the oil back towards its source thus to eliminate leakage. Such devices were originally proposed by Chicago Rawhide Corporation of Chicago, Ill. More recently, hydrodynamic face seal technology has emerged in which gas is used as the sealing fluid, with the gas being maintained within the original chamber through a face seal having a number of channels and apertures which maintain the gas within the chamber. However, with respect to pumps and the utilization of mechanical braided packing, no such hydrodynamic sealing devices have been utilized.

SUMMARY OF THE INVENTION

A reliable leak free sealing system capable of overcoming the pressure surges is provided in the subject invention through the utilization of mechanical braided packing in which either angled recesses or projections are provided in the surface of the packing which abut the rotating shaft. Note that of necessity in the braiding process, the recesses or projections will appear on the other sides of the packing. The angle is such that given a particular rotation of the shaft, any fluid that exists between the shaft and the bottom face of the packing is pushed aft or backwardly away from the gland annulus and into the body of the pump. As such, the subject invention is referred to as pumpback packing. In one embodiment, the recesses or projections are provided in the mechanical braiding process, in which the yarns carried by selected carriers are either provided with an increased or decreased yarn diameter, an increased or decreased carrier tension, or an increased or decreased number of yarn ends, which refers to the number of yarns plied together on a specific braided carrier.

To create recesses along the inner surface of the particular mechanical braided packing, in one embodiment a secondary yarn of suitable smaller size is used as compared to the normal, primary yarn forming the bulk of the packing. One can then create recesses in the mechanical braided packing which are angled in a predetermined direction in the normal braiding process on a four-track braiding machine. These same recesses can also be formed through utilizing a higher tension for the secondary yarn, which causes the yarn to draw below the surface of the packing, and thereby provides the recesses at the appropriate positions at the bottom side of the mechanical braided packing. A farther way to provide the recesses is to provide fewer ends for the yarn, when multiple ends are used on the braided carrier, again making the yarn braided from the carrier less thick. Regardless of how the recesses are made, they are caused to exist through the thinning down or narrowing of the secondary yarn. Note that the secondary yarn may be of the same material as the primary yarn or another yarn suitable for the purpose.

Likewise, in order to provide projections which are angled and abut the rotating shaft, more ends are utilized in the yarn, less tension is utilized or larger yarns in general are utilized. The net result is the same. Any fluid that exists between the rotating shaft and the bottom surface of the mechanical braided packing ring is moved in a direction away from the annulus of the packing gland.

In one embodiment, the existence of exfoliated graphite permits a very malleable component of the secondary yarn whose heat transfer characteristic is quite high. When used in combination with graphite filament as the secondary yarn, the composite is strong enough to produce the recess required. It will be appreciated that tensioning such a yarn can be increased above that which is normally associated with the primary yarn i.e., exfoliated graphite. In one embodiment, the yarn is available from SGL Technologies of Valencia, Calif. from their Polycarbon Division as Style GH1000. It will be appreciated that this yarn is a zero twist yarn to give a flat surface such that when used about a shaft better heat transfer occurs.

Regardless of what way the recesses or projections are formed in the braid, it is the angled nature of these recesses or projections which provides a backward pumping action for any fluid that exists between the mechanical braided packing ring and the shaft. Orientation of the angled recesses or projections depends upon the direction of shaft rotation. With a shaft rotating in the clockwise directions as viewed from the bottom of the stuffing box, the packing ring at the gland of the stuffing box has its recesses or projections angled such that any fluid between the shaft and the packing ring first enters the recess or projection at the position of the recess or projector which is closest to the closest orifice of the stuffing box, in this case the packing gland. The fluid in the recess is deflected aft in a direction away from the gland annulus towards the throat of the stuffing box, thereby precluding the normal leakage from occurring out through the annulus of the gland.

While the subject invention will be described in conjunction with recesses for illustrative purposes only, it will be appreciated that projections angled in the same direction of the recess will serve the same pumpback function. The subject pumpback packing system has application throughout the pumping industry to prevent fluids from one side of the packing set from exiting the other side of the packing set.

Moreover, the subject system can be utilized for injectable lubricants in which fibrous grease is injected into the stuffing box between two sets of packing consisting of one ring each, each ring having the suitable recesses to provide a "pumpback" action on the injectable packing. In this case, elimination of effluent from the stuffing box is achieved through the angled recess/projection system provided by the particular braiding system utilized for making the mechanical braided packing.

In summary, mechanical packing in the form of a pumpback packing is braided in such a way that a number of angled recesses or projections appear on that surface of the braid adjacent the rotating shaft, with the angle of the recesses or projections being such that fluid existing between the rotating shaft and the bottom surface of the mechanical braided packing ring is deflected back into the stuffing box in a direction away from the apertures of the stuffing box in which the mechanical braiding packing ring is installed. Given a particular direction of rotation of the shaft, any fluid between the shaft and the packing ring enters the angled recess or projection area at a position closest to the aperture and moves away from the aperture. In this manner, a virtual leak-free packing system is provided, thereby eliminating pumped product from escaping or permitting the utilization of seal water, with zero flow, with the pumpback packing preventing leakage of either pumpage or seal water to the outside, thus meeting environmental standards, and reducing water consumption.

BRIEF DESCRIPTION OF THE DRAWINGS

These and other features of the Subject Invention will be better understood in connection with the Detailed Description in conjunction with the Drawings of which.

DETAILED DESCRIPTION

Figure 1:
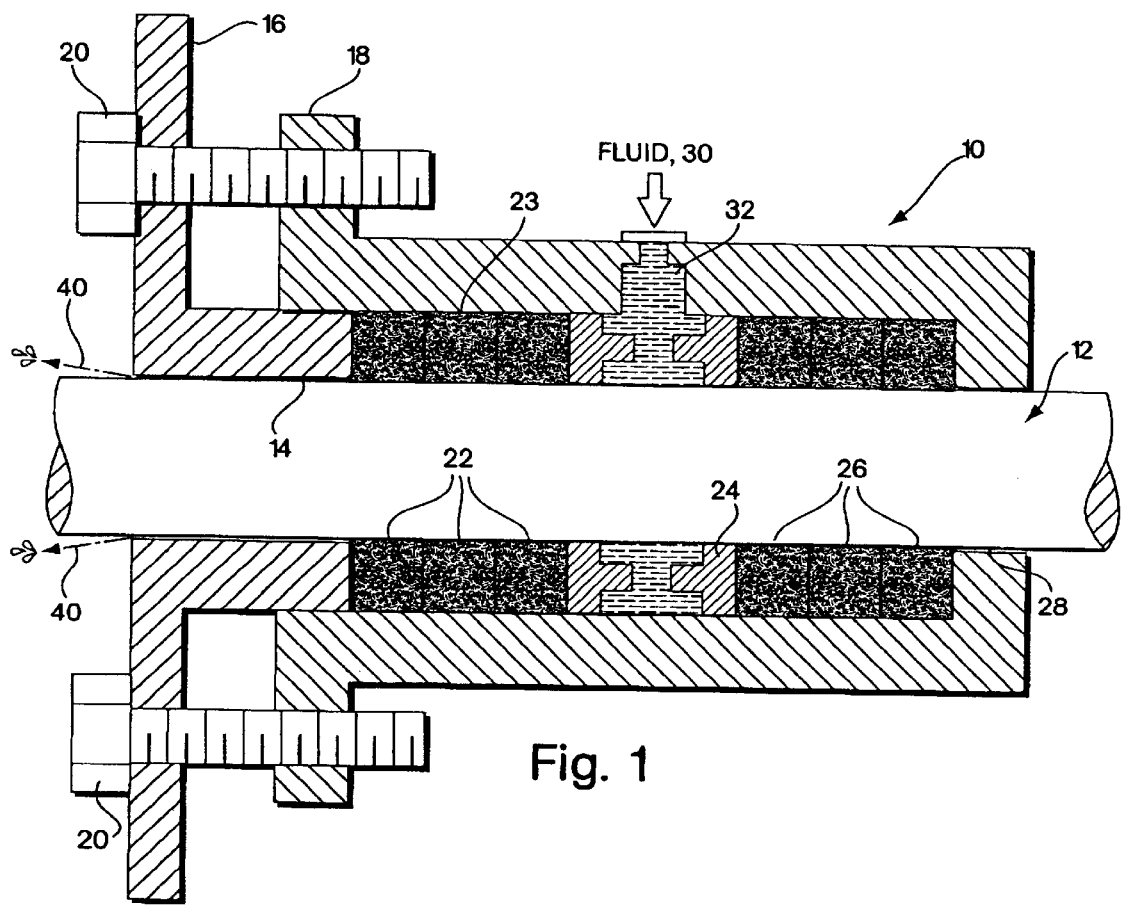
FIG. 1 is a cross-sectional view of a stuffing box in which fluid leaks from the stuffing box at the annulus between the gland and the pump shaft.

Referring now to FIG. 1, a stuffing box 10 is positioned about a pump shaft 12, with the pump shaft projecting through an annulus 14 of a packing gland 16 bolted to flange 18 of stuffing box 10 by bolts 20. Internal to the stuffing box is a number of packing rings 22 in a bore 23, which are disposed adjacent gland 16. A lantern ring 24 is positioned against the innermost of packing rings 22 and a number of packing rings 26 are located between lantern ring 24 and the throat 28 of stuffing box 10. In one embodiment, fluid 30 is injected into an orifice 32 in stuffing box 10, with the fluid being clean sealing water, the purpose of which is to provide lubrication between rings 22 and 26 and shaft 12, and to provide a barrier to pumpage from the pump so that any leakage from stuffing box 10 is clean sealing water.

In normal operation of the pump, leakage indicated by arrows 40 exits annulus 14, with the leakage either being seal water when used, or pumpage due in most cases to the aforementioned surges when running dry. The result is unwanted leakage from the stuffing box.

It will be appreciated that while the embodiment illustrated shows two sets of packing rings separated by a lantern ring, in a preferred embodiment, the entire stuffing box is filled with rings of packing. One or more of these rings may be provided with the subject recesses or projections so as to eliminate or minimize leakage at the packing gland.

Figure 2:
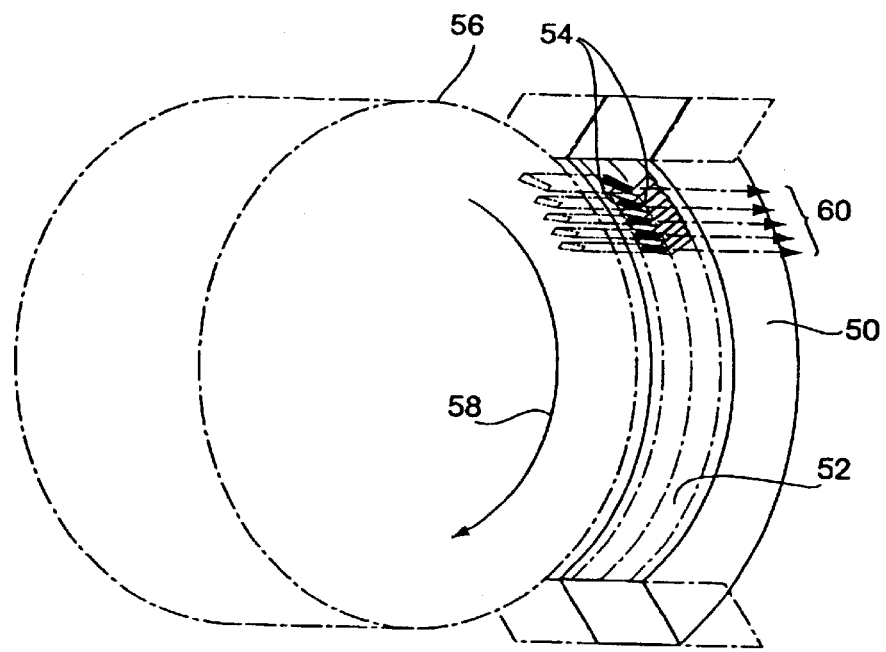
FIG. 2 is a diagrammatic representation of the pumpback action of a packing ring made in accordance with the subject invention in which angled recesses or projections force fluid between the rotating pump shaft and the interface of the packing back towards the center of the stuffing box, thereby precluding leakage out of the stuffing box at the gland.

Referring now to FIG. 2, a packing ring 50 is configured such that a bottom surface 52 of ring 50 is provided with a number of angled portions 54, which either constitute recesses in the packing ring, or projections as will be described. A pump shaft is shown in phantom at 56 rotating in the direction illustrated by arrow 58, with the result that any fluid between shaft 56 and ring 50 is hydrodynamically forced by virtue of the angled recesses or projections in the direction illustrated by arrow 60.

The result of the hydrodynamic pumpback action is that the fluid spiraling outboard is deflected aft and thus, back into the stuffing box, thereby virtually eliminating leakage from the stuffing box.

Figure 3:
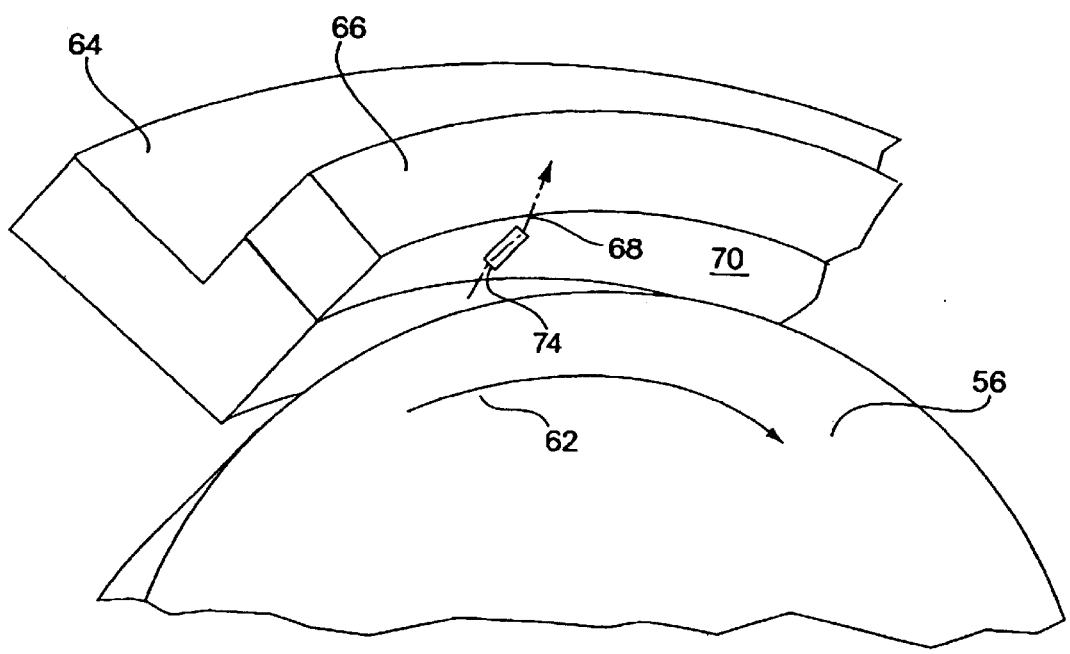
FIG. 3 is a diagrammatic representation of the fluid flow from the rotating shaft as it is redirected by the angled recess or projection in the face of the packing ring adjacent the shaft, showing the movement of the fluid away from the packing gland towards the center of the stuffing box.

Referring now to FIG. 3, pump shaft 56 is shown rotating in the direction illustrated by arrow 62, with a packing gland 64 pushing against the last ring 66 in the set. This ring has a recess 68 angled such that fluid between shaft 56 and bottom face 70 of ring 66 moves in the direction of dotted arrow 72 and enters the recess along its length 74. Thereafter, the fluid travels down the recess and exits as illustrated in the direction of arrow 72. If, rather than being a recess, a projection is used, the fluid spiraling down the shaft is redirected by the projection as shown by arrow 72', away from the annulus of the packing gland. Thus whether a recess or a projection is utilized, fluid in the microscopic region between the shaft and the bottom face of the packing ring is redirected away from the annulus of the packing gland and towards the center of the stuffing box. It will be appreciated by the direction of arrow 72 or 72' that the fluid is moving away from packing gland 64 towards the center of the stuffing box.

Figure 4:
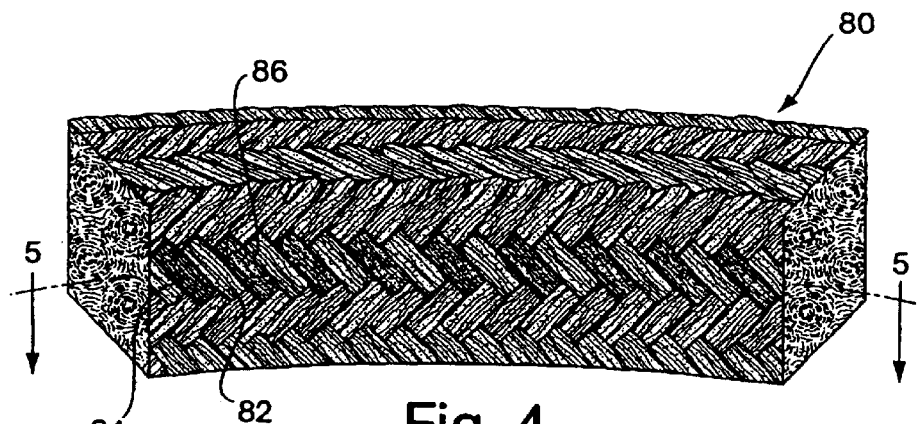
FIG. 4 is a perspective view of a portion of the subject packing ring, showing the angled recesses in the bottom face thereof.

Referring now to FIG. 4, in one embodiment, a section 80 of a mechanical braided packing ring is illustrated in which the bottom face 82 of the packing ring is provided with a number of angled recesses 84 and 86, in this case alternated between non-recessed yarns.

Figure 5:
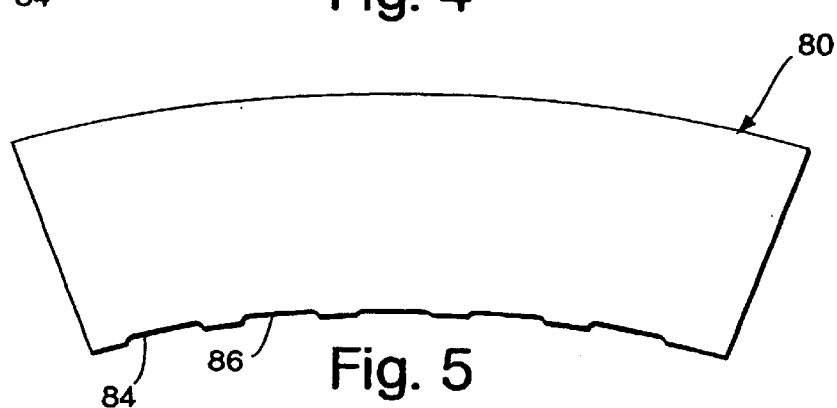
FIG. 5 is a a cross-sectional view of the packing ring of FIG. 4, showing the recesses.

As illustrated in FIG. 5, recesses 84 and 86 are clearly visible in a section taken along dotted section line 5.

Figure 6:
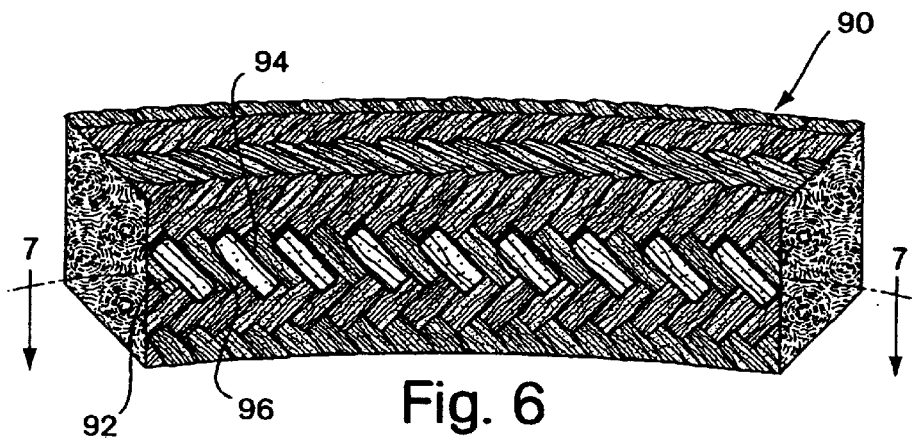
FIG. 6 is a perspective view of a portion of the subject packing ring, showing angled projections in the bottom face thereof; and, FIG. 7 is a cross-sectional view of the packing ring of FIG. 6, showing the projections.

Referring now to FIG. 6, a section 90 of a mechanical braided packing ring is provided with projections 92 and 94 in the bottom surface 96 of the packing ring.

Figure 7:
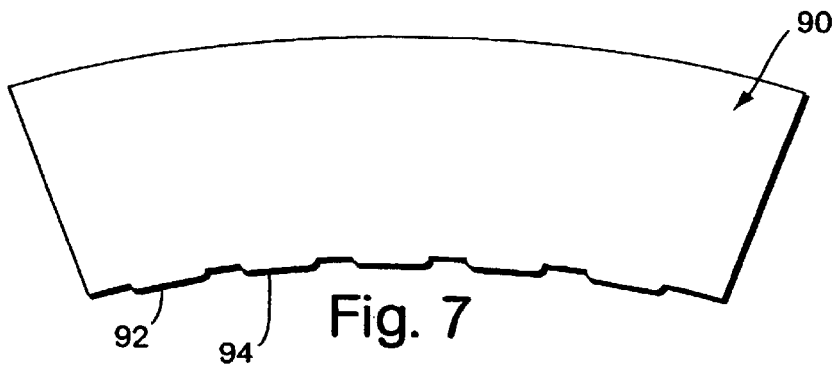

The cross-section in FIG. 7 is taken along dotted section line 6, such that projections 92 and 94 are clearly shown.

It will be appreciated that in both the FIG. 4 and the FIG. 6 embodiments, angled recesses or projections are formed in the bottom face of the braided packing ring in an alternated pattern, with the pattern produced in one embodiment during the braiding process. For example, in a four-track braider, alternate carriers in the second braider track may be provided with yarns which either have a smaller diameter to form the recesses or which have a larger diameter to form the projections. The same recesses or projections can be provided by adjusting the tension on the yarn during braiding; with an increased tension providing for the recess, and a decreased tension providing for the projection. Moreover, with the number of yarns that are plaited together to form the yarn on the second carrier can be either increased to provide for the projection or decreased to provide for the recess.

What will be appreciated is that there are a number of ways of forming angled recesses or projections in the bottom face of the packing ring. As noted before, when providing the recesses or the projections in the bottom face of the packing ring, these projections and recesses will be provided on all surfaces of the packing. However, it is only the surface adjacent the shaft which is important in the hydrodynamic pumping action associated with the packing ring.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A pumpback system for eliminating leakage from a stuffing box at the annulus of the packing gland thereof through which a pump shaft passes, comprising:

a packing sing in the bore of said stuffing box and adapted to be positioned about said shaft, said packing ring having a bottom face having a series of recesses or projections therein of sufficient depth or height relative to said bottom face and angled with respect to the centerline of said shaft such that fluid between said bottom surface and said shaft moves along at least one recess or projection and along said shaft away from said annulus for a given direction of rotation of said shaft to provide a pumpback action such that fluid in said stuffing box is prevented from exiting said annulus, said packing ring being made from yarn, said recess or projection being made by providing that said yarn take on a predetermined physical characteristic.

2. The system of claim 1, wherein said predetermined direction is away from said annulus.

3. The system of claim 1, wherein said stuffing box has a throat and wherein said predetermined direction is away from said throat towards the center of said stuffing box.

4. The system of claim 1, wherein said predetermined physical characteristic includes the thickness of said yarn.

5. The system of claim 4, wherein the thickness of said yarn is determined by the tension of said yarn on said carrier.

6. The system of claim 4, wherein the thickness of said yarn is determined by the size of said yarn.

7. The system of claim 4, wherein said yarn is plaited and wherein the thickness of said yarn is determined by the number of plaited strands thereof.

\* \* \* \* \*